US009966757B2

(12) United States Patent  
Cao

(10) Patent No.: US 9,966,757 B2  
(45) Date of Patent: May 8, 2018

(54) OVER-VOLTAGE PROTECTION CIRCUIT AND ELECTRONIC DEVICE

(71) Applicant: SHENZHEN CHINA STAR OPTOELECTRONICS TECHNOLOGY CO., LTD., Shenzhen, Guangdong (CN)

(72) Inventor: Dan Cao, Guangdong (CN)

(73) Assignee: SHENZHEN CHINA STAR OPTOELECTRONICS TECHNOLOGY CO., LTD., Shezhen (CN)

( * ) Notice: Subject to any disclaimer, the term of this patent is extended or adjusted under 35 U.S.C. 154(b) by 244 days.

(21) Appl. No.: 14/008,458

(22) PCT Filed: Jun. 29, 2013

(86) PCT No.: PCT/CN2013/078527  
§ 371 (c)(1),  
(2) Date: Sep. 27, 2013

(87) PCT Pub. No.: WO2014/187017  
PCT Pub. Date: Nov. 27, 2014

(65) Prior Publication Data  
US 2017/0310102 A1 Oct. 26, 2017

(30) Foreign Application Priority Data  
May 20, 2013 (CN) .......................... 2013 1 0187491

(51) Int. Cl.  
*H02H 9/04* (2006.01)  
*H02H 1/00* (2006.01)

(52) U.S. Cl.  
CPC .......... *H02H 9/045* (2013.01); *H02H 1/0007* (2013.01); *H02H 1/0061* (2013.01)

(58) Field of Classification Search  
CPC .... H02H 9/045; H02H 1/0007; H02H 1/0061; H05B 33/0878; H05B 33/0881; H05B 33/0809  
See application file for complete search history.

(56) References Cited

U.S. PATENT DOCUMENTS

| | | | |
|---|---|---|---|
| 2010/0244800 A1 | 9/2010 | Nakamura et al. | |
| 2011/0109231 A1 | 5/2011 | Shiu et al. | |
| 2013/0063411 A1* | 3/2013 | Hou ...................... | G09G 3/3648 345/212 |

FOREIGN PATENT DOCUMENTS

| | | |
|---|---|---|
| CN | 201656423 U | 11/2010 |
| CN | 201846423 U | 5/2011 |

(Continued)

OTHER PUBLICATIONS

Zixiao Liu, the International Searching Authority written comments, Jan. 2014, CN.

*Primary Examiner* — Rexford Barnie  
*Assistant Examiner* — Thai Tran

(57) ABSTRACT

An over-voltage protection circuit for executing an over-voltage protection for a LED module of an electronic device. The over-voltage protection circuit includes a control unit and an over-voltage detection module, a trigger module and an adjustment module. The LED module includes a positive input port. The over-voltage detection module detects a voltage of the positive input port of the LED module and produce a detection voltage proportional to the voltage of the positive input port. The control unit controls the LED module to work or do not work according to the detection voltage. The trigger module produces corresponding trigger signals according to a 2D signal or a 3D signal output by a 2D/3D signal port. The adjustment module adjusts the proportion between the detection voltage and the voltage of the positive input port according to the trigger signal.

17 Claims, 3 Drawing Sheets

(56) References Cited

FOREIGN PATENT DOCUMENTS

| CN | 102751705 | A | 10/2012 |
| CN | 102790373 | A | 11/2012 |
| CN | 102891466 | A | 1/2013 |
| CN | 103050094 | A | 4/2013 |
| CN | 103050096 | A | 4/2013 |

* cited by examiner

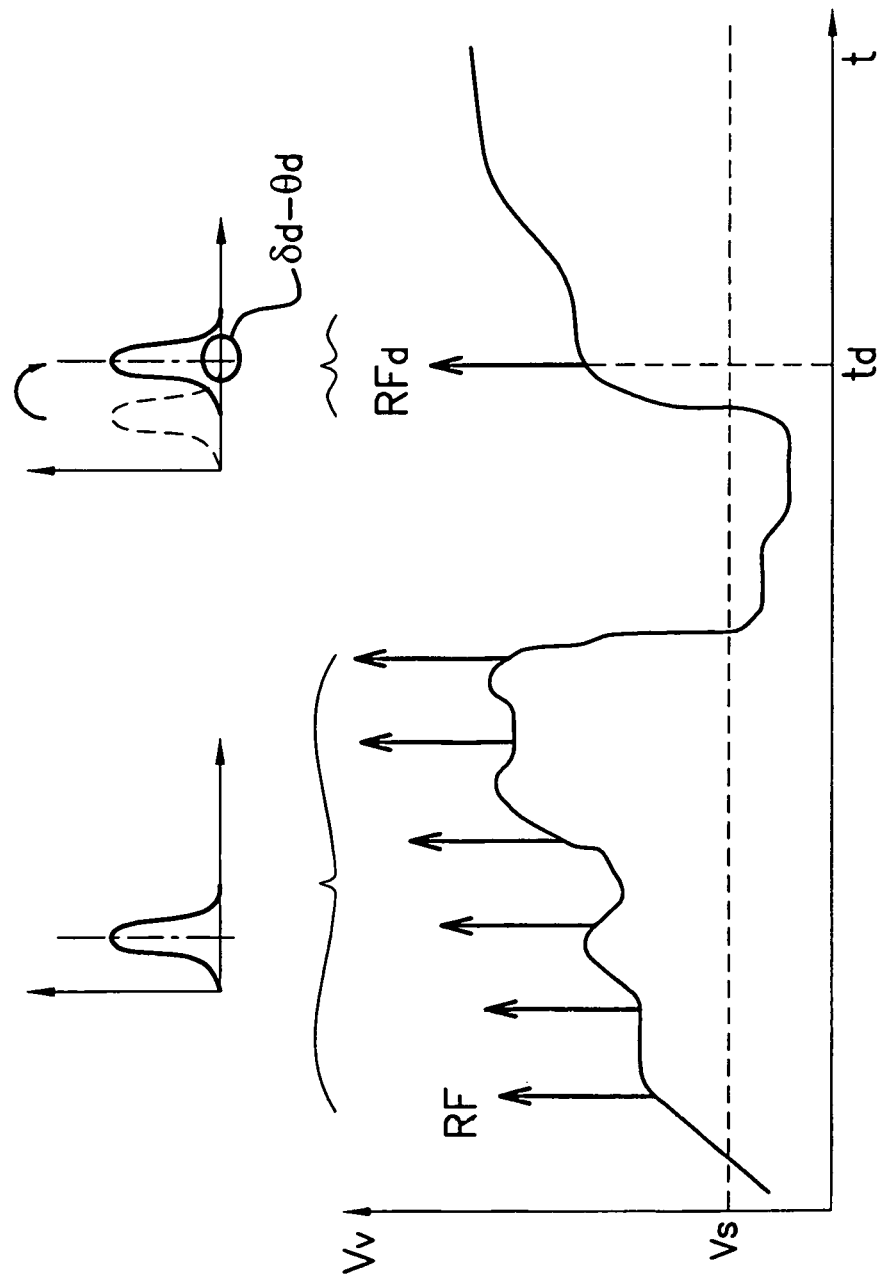

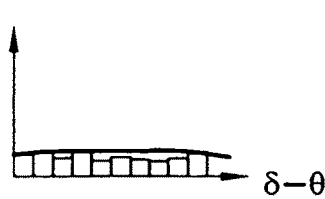
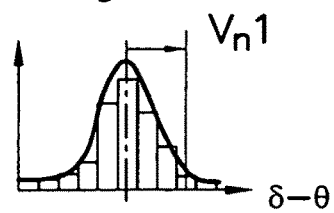
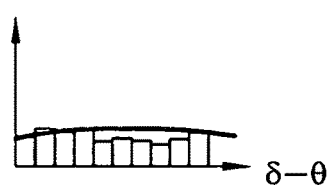
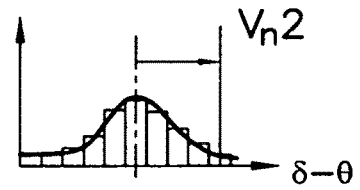
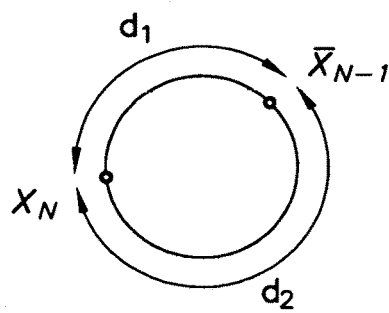
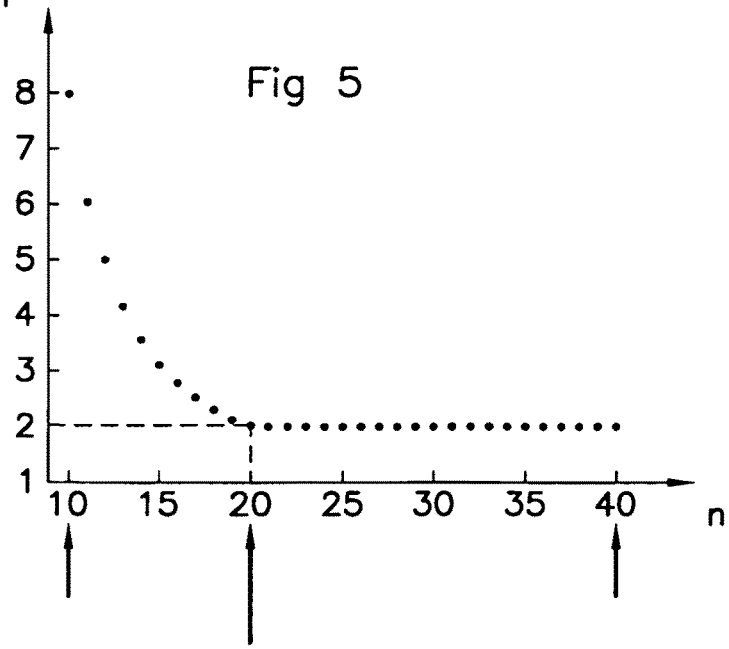

OVER-VOLTAGE PROTECTION CIRCUIT AND ELECTRONIC DEVICE

TECHNICAL FIELD OF THE INVENTION

The present invention relates to a protection circuit, and more particularly, to an over-voltage protection circuit and an electronic device with the same.

BACKGROUND OF THE INVENTION

Nowadays, more and more electronic devices use light-emitting diodes (LEDs) as backlight. Usually, these electronic devices, such as televisions and displays, can be worked at a two-dimensional (2D) mode or a three-dimensional (3D) mode. When the electronic device is worked at the 2D mode or the 3D mode, an over-voltage protection voltage triggering the over-voltage protection is the same. However, when the electronic device is worked normally, a work voltage of the LEDs of the 2D mode is lower than that of the 3D mode. Because the over-voltage protection voltage of the 2D mode is the same as that of the 3D mode, when the work voltage of the LEDs reaches or exceeds the over-voltage protection voltage, the over-voltage protection voltage is largely greater than the normal work voltage of the LEDs of the 2D mode. Then, when the electronic device is worked at the 2D mode, the time to trigger the over-voltage protection is very long, which is easy to cause components of the electronic device to be damaged.

SUMMARY OF THE INVENTION

The present invention provides an electronic device and an over-voltage protection circuit, which capable of executing over-voltage protection quickly when the electronic device is worked at the 2D mode.

An electronic device comprises a power source, a LED module, and a over-voltage protection circuit. The over-voltage protection circuit comprises a control unit, a over-voltage detection module, a trigger module, and an adjustment module. Therein, the LED module comprises a positive input port and a controlled port, the power source comprises an output port, the control unit comprises a control port and an over-voltage protection port; the over-voltage detection module is connected between the positive input port and ground, and is configured to detect a voltage of the positive input port of the LED module and produce a detection voltage proportional to the voltage of the positive input port; the over-voltage protection port of the control unit is configured to receive the detection voltage, the control port is connected to the controlled port of the LED module, the control unit is configured to control the LED module to work or do not work according to the detection voltage received by the over-voltage protection port. Therein, the trigger module is connected to a 2D/3D signal port and is used to receive a 2D signal or a 3D signal from the 2D/3D signal port and produce corresponding trigger signals, the 2D/3D signal port produces the 2D signal when the electronic device is worked at a 2D mode and produces the 3D signal when the electronic device is worked at a 3D. The adjustment module is connected between the over-voltage detection module and the trigger module, and is used to adjust the proportion between the detection voltage produced by the over-voltage detection module and the voltage of the positive input port according to the trigger signal produced by the trigger module.

Therein, the trigger module produces a 2D trigger signal when receiving the 2D signal output by the 2D/3D signal port, and produces a 3D trigger signal when receiving the 3D signal output by the 2D/3D signal port.

Therein, the adjustment module increases the proportion between the detection voltage and the voltage of the positive input port when receiving the 2D trigger signal, and decreases the proportion between the detection voltage and the voltage of the positive input port when receiving the 3D trigger signal.

Therein, the LED module comprises a number of LED strings connected between the positive input port and ground in parallel, each LED string comprise several light-emitting diodes (LEDs) and a first N-channel metal oxide semiconductor field effect transistor (NMOS FET) which are connected in series; the LEDs are connected between the positive input port and a drain of the NMOS FET, a source of the first NMOS FET is grounded, a gate of the NMOS FET constitutes the controlled port.

Therein, the over-voltage detection module comprises a first resistor, a second resistor, and a third resistor which are connected between the positive input port and the ground in series; a connection node of the second resistor and the third resistor constitutes a detection terminal, a voltage of the detection terminal is the detection voltage produced by the over-voltage detection module, the detection terminal is connected to the over-voltage protection port of the control unit, and outputs the detection voltage to the over-voltage protection port of the control unit.

Therein, the adjustment module comprises a second NMOS FET, a source and a drain of the second NMOS FET are respectively connected to two ends of the second resistor.

Therein, the trigger module comprises a fourth resistor and a third NMOS FET, the fourth resistor is connected between a voltage port and a drain of the third NMOS FET, a source of the third NMOS FET is grounded, a gate of the third NMOS FET is connected to the 2D/3D signal port.

Therein, each LED string of the LED module further comprises a fifth resistor connected between the first NMOS FET and the ground; the control unit further comprises a plurality of signal pins, ends of the fifth resistors of these LED strings far away from the ground are connected to the signal pins one by one; the signal pins are configured to detect current flowing though the LED strings.

Therein, the electronic device is one selected from the group consist with a television, a display, a mobile phone, and a tablet computer.

An over-voltage protection circuit is used to execute an over-voltage protection for a LED module of an electronic device, the over-voltage protection circuit comprises a control unit, an over-voltage detection module, a trigger module, and an adjustment module. The LED module comprises a positive input port and a controlled port. The over-voltage detection module is connected between the positive input port and ground and is used to detect a voltage of the positive input port of the LED module and produce a detection voltage proportional to the voltage of the positive input port. The control unit comprises a control port and an over-voltage protection port; the over-voltage protection port of the control unit is used to receive the detection voltage, the control port is connected to the controlled port of the LED module, the control unit is used to control the LED module to work or do not work according to the detection voltage received by the over-voltage protection port. The trigger module is connected to a 2D/3D signal port, and is used to receive a 2D signal or a 3D signal from the 2D/3D signal port and produce corresponding trigger signals, the 2D/3D signal port produces the 2D signal when the electronic device is worked at a 2D mode and produces the 3D signal when the electronic device is worked at a 3D. The adjustment module is connected between the over-voltage detection module and the trigger module, and is used to adjust the proportion between the detection voltage produced by the over-voltage detection module and the voltage of the positive input port according to the trigger signal produced by the trigger module.

Therein, the trigger module produces a 2D trigger signal when receiving the 2D signal output by the 2D/3D signal port, and produces a 3D trigger signal when receiving the 3D signal output by the 2D/3D signal port.

Therein, the adjustment module increases the proportion between the detection voltage and the voltage of the positive input port when receiving the 2D trigger signal, and decreases the proportion between the detection voltage and the voltage of the positive input port when receiving the 3D trigger signal.

Therein, the LED module comprises a number of LED strings connected between the positive input port and ground in parallel, each LED string comprise several light-emitting diodes (LEDs) and a first N-channel metal oxide semiconductor field effect transistor (NMOS FET) which are connected in series; the LEDs are connected between the positive input port and a drain of the NMOS FET, a source of the first NMOS FET is grounded, a gate of the NMOS FET constitutes the controlled port.

Therein, the over-voltage detection module comprises a first resistor, a second resistor, and a third resistor which are connected between the positive input port and the ground in series; a connection node of the second resistor and the third resistor constitutes a detection terminal, a voltage of the detection terminal is the detection voltage produced by the over-voltage detection module, the detection terminal is connected to the over-voltage protection port of the control unit, and outputs the detection voltage to the over-voltage protection port of the control unit.

Therein, the adjustment module comprises a second NMOS FET, a source and a drain of the second NMOS FET are respectively connected to two ends of the second resistor.

Therein, the trigger module comprises a fourth resistor and a third NMOS FET, the fourth resistor is connected between a voltage port and a drain of the third NMOS FET, a source of the third NMOS FET is grounded, a gate of the third NMOS FET is connected to the 2D/3D signal port.

Therein, each LED string of the LED module further comprises a fifth resistor connected between the first NMOS FET and the ground; the control unit further comprises a plurality of signal pins, ends of the fifth resistors of these LED strings far away from the ground are connected to the signal pins one by one; the signal pins are configured to detect current flowing though the LED strings.

The electronic device and the over-voltage protection circuit of the present invention capable of executing over-voltage protection quickly when the electronic device is worked at the 2D mode or the 3D mode.

BRIEF DESCRIPTION OF THE DRAWINGS

FIG. 2 illustrates a circuit diagram of the electronic device with an over-protection circuit of FIG. 1.

DETAILED DESCRIPTION OF THE PREFERRED EMBODIMENTS

Figure 1:
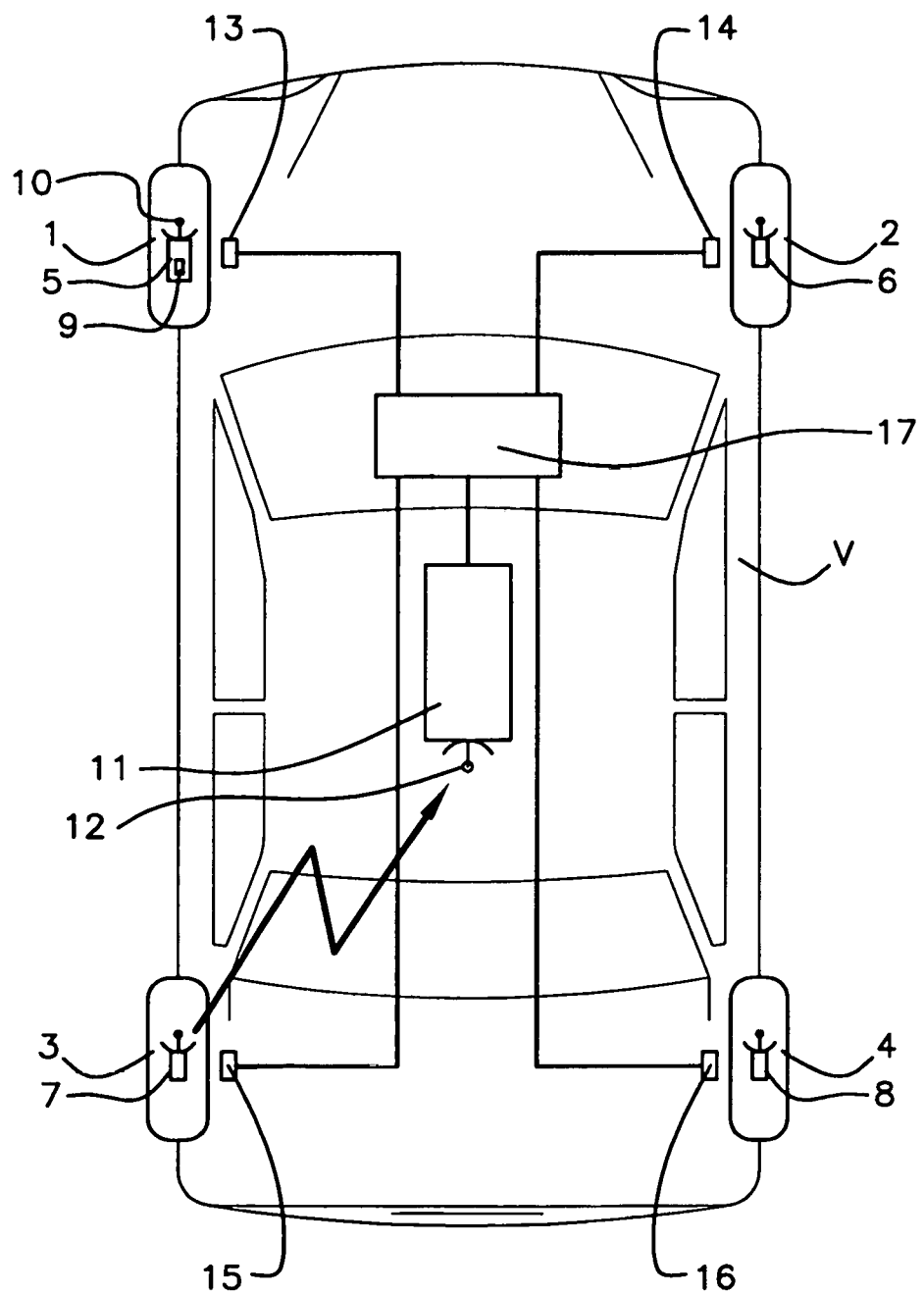
FIG. 1 illustrates a block diagram of an electronic device with an over-protection circuit, in according to an example embodiment.

Referring to FIG. 1, an electronic device 100 with an over-protection circuit 30 is provided. The electronic device 100 includes a power source 10, a LED module 20, the over-protection circuit 30, and a 2D/3D signal port 40.

The LED module 20 includes a positive input port 201 and a controlled port 202, the control unit 31 includes a power port ISEN, a control port CP and an over-voltage protection port OVP.

The power source 10 includes an output port Vin, the output port Vin is connected to the positive input port 201 of the LED module 20 and the power port ISEN of the control unit 21. The power source 10 provides power to the LED module 20 and the control unit 31 via the output port Vin. The power source 10 can be a battery or a power adapter.

The 2D/3D signal port 40 is used to produce a 2D signal or a 3D signal when the electronic device 100 works at a 2D mode or a 3D mode. The 2D/3D signal port 40 can be a pin of a processing unit (not shown), the processing unit outputs the 2D signal or the 3D signal via the pin according to the current mode of the electronic device 100.

The over-voltage protection circuit 30 includes the control unit 31, an over-voltage detection module 32, a trigger module 33, and an adjustment module 34. The control port CP of the control unit 31 is connected to the controlled port 202 of the LED module 20, the control unit 31 is used to enable the LED module 20 to work or disable the LED module 20 to not work. Namely, the control unit 31 is used to turn on the LED module 20 or turn off the LED module 20.

The over-voltage detection module 32 is connected between the positive input port 201 of the LED module 20 and ground, and is used to detect a voltage of the positive input port 201 and produce a detection voltage proportional to the voltage of the positive input port 201.

The over-voltage protection port OVP is connected to the over-voltage detection module 32, and is used to receive the detection voltage produced by the over-voltage detection module 32. The control unit 31 turns on or off the LED module 20 according to the detection voltage received by the over-voltage protection port OVP. In detail, the control unit 31 executes an over-voltage protection function when determining the detection voltage is greater than an over-voltage protection voltage. The control unit 31 executes an over-voltage protection function is: the control unit 31 outputs an off signal to the controlled port 202 of the LED module 20 to turn off the LED module 20.

The trigger module 33 is connected to the 2D/3D signal port 40, the trigger module 33 is used to receive the 2D signal or the 3D signal from the 2D/3D signal port 40 and produce corresponding trigger signals according to the received 2D signal or 3D signal. In detail, the trigger module 34 produces a 2D trigger signal when receiving the 2D signal, and produces a 3D trigger signal when receiving the 3D signal.

The adjustment module 34 is connected between the over-voltage detection module 32 and the trigger module 33, and is used to adjust the proportion between the detection voltage produced by the over-voltage detection module 32 and the voltage of the positive input port 201 according to the trigger signal produced by the trigger module 33.

In detail, the adjustment module 34 increases the proportion between the detection voltage and the voltage of the positive input port 201 when receiving the 2D trigger signal, and decreases the proportion between the detection voltage and the voltage of the positive input port 201 when receiving the 3D trigger signal. That is, when the electronic device 100 is worked at the 2D mode, the adjustment module 34 increases the proportion between the detection voltage and the voltage of the positive input port 201. When the electronic device 100 is worked at the 3D mode, the adjustment module 34 decreases the proportion between the detection voltage and the voltage of the positive input port 201.

Therefore, when the electronic device 100 is worked at the 2D mode, because the proportion between detection voltage and the voltage of the positive input port 201 is greater than that proportion in the 3D mode, the detection voltage can increase quickly when the voltage of the positive input port 201 increases. Thus, in the present invention, the electronic device 100 can execute over-voltage protection more quickly when the electronic device 100 is worked at the 2D mode.

In the embodiment, the electronic device 100 also includes a voltage conversion circuit 40. The voltage conversion circuit 40 is used to convert the voltage output by the power source 10 to a suitable voltage to power the LED module 20 and the control unit 31. In another embodiment, the voltage conversion circuit 40 can be omitted, the voltage output by the power source 10 powers the LED module 20 and the control unit 31 directly. In further another embodiment, the power source 10 includes voltage conversion function, and can output suitable voltage.

In the embodiment, the electronic device 100 can be a television, a display, a mobile phone, and a tablet computer.

Referring to FIG. 2, in the embodiment, the LED module 20 includes a number of LED strings 21 connected between the positive input port 201 and the ground in parallel. Each LED string includes several light-emitting diodes (LEDs) D1 and an N-channel metal oxide semiconductor field effect transistor (NMOS FET) Q1 which are connected in series. Therein, the LEDs D1 are connected between the positive input port 201 and a drain of the NMOS FET Q1. A source of the NMOS FET Q1 is grounded, a gate of the NMOS FET Q1 constitutes the controlled port 202.

The over-voltage detection module 32 includes a first resistor R1, a second resistor R2, and a third resistor R3 which are connected in series between the positive input port 201 and the ground in series. A connection node of the second resistor R2 and the third resistor R3 constitutes a detection terminal 321, a voltage of the detection terminal 321 is the detection voltage produced by the over-voltage detection module 32. The detection terminal 321 is connected to the over-voltage protection port OVP of the control unit 31, and outputs the detection voltage to the over-voltage protection port OVP of the control unit 31.

The trigger module 33 includes a fourth resistor R4 and a NMOS FET Q2. The fourth resistor R4 is connected a voltage port Vcc and a drain of the NMOS FET Q2. A source of the NMOS FET Q2 is grounded, a gate of the NMOS FET Q2 is connected to the 2D/3D signal port 40. In the embodiment, the voltage port Vcc is connected to a battery (not shown) of the electronic device 100 and at high voltage, such as, 5 volts.

The adjustment module 34 includes a NMOS FET Q3, a source and a drain are respectively connected to two ends of the second resistor R2.

The control port CP of the control unit 31 includes a number of control pins C1, C2. The control pins C1, C2 are respectively connected to gates of the NMOS FETs Q1 of the LED strings. The number of the control pins C1, C2 is equal to that of the LED strings.

In the embodiment, the 2D signal produced by the 2D/3D signal port 40 is a low voltage signal and the 3D signal produced by the 2D/3D signal port 40 is a high voltage signal. The 2D trigger signal produced by the trigger module 33 is the high voltage signal and the 3D trigger signal produced by the trigger module 33 is the low voltage signal.

When the electronic device 100 is worked at the 2D mode, the 2D/3D signal port 40 produces the 2D signal with the low voltage to the gate of the NMOS FET Q2. Thus, the NMOS FET Q2 is turned off when the gate of the NMOS FET receives the 2D signal with the low voltage. The gate of the NMOS FET Q3 is electrically connected to the voltage port Vcc via the fourth resistor R4 and at high voltage, namely, the gate of the NMOS FET Q3 receives the 2D trigger signal with the high voltage. The NMOS FET Q3 is turned on accordingly and then bypasses the second resistor R2. The voltage of the positive input port 201 is divided by the first resistor R1 and the third resistor R3. Assume the voltage of the positive input port 201 is V+, then the detection voltage is equal to R3*V+/(R1+R3). Namely, the proportion between the detection voltage and the voltage of the positive input port 201 is R3/(R1+R3) now.

When the electronic device 100 is worked at the 3D mode, the 2D/3D signal port 40 produces the 3D signal with the high voltage to the gate of the NMOS FET Q2. Thus, the NMOS FET Q2 is turned on when the gate of the NMOS FET receives the 3D signal with the high voltage. The gate of the NMOS FET Q3 grounded via the NMOS FET Q2 which is turned on and at low voltage, namely, the gate of the NMOS FET Q3 receives the 3D trigger signal with the low voltage. The NMOS FET Q3 is turned off accordingly. The voltage of the positive input port 201 is divided by the first resistor R1, the second resistor R2 and the third resistor R3. Then the detection voltage is equal to R3*V+/(R1+R2+R3). Namely, the proportion between the detection voltage and the voltage of the positive input port 201 is R3/(R1+R2+R3) now.

The proportion R3*V+/(R1+R3) in the 2D mode is greater than the proportion R3*V+/(R1+R2+R3) in the 3D mode. Therefore, when the electronic device 100 is worked at the 2D module, because the proportion between the detection voltage and the voltage of the positive input port 201 is greater, if the voltage of the positive input port 201 is increased, the detection voltage is increased greater and can exceed the over-voltage protection voltage more quicker, which shortens the time triggering the over-voltage protection in the 2D mode.

In the embodiment, the voltage conversion circuit 50 includes a transformer winding L1, the transformer winding L1 converts a voltage output by the power source 10 to a suitable voltage and provides the suitable voltage to the LED module 20. As shown in FIG. 2, the electronic device 100 also includes a diode D2, the diode D2 is connected between the transformer winding L1 and the positive input port V+, and is used to prevent the reverse current.

In the embodiment, each LED string 21 of the LED module 20 also includes a resistor R connected between the NMOS FET Q1 and the ground. The control unit 10 also includes a number of signal pins S1~S2. Ends of the resistors R of these LED strings 21 far away from the ground are connected to the signal pins S1-S2 one by one. Therein, the number of the signal pins S1~S2 is equal to the number of the LED strings 21. Obviously, the number of the signal pins S1~S2 is changed follows the change of the number of the LED strings 21. The signal pins S1~S2 are used to detect the current flowing though the LED strings 21, the detected current are provided to the control unit 10 for further controlling.

The NMOS FETs Q1~Q3 can be instead by negative-positive-negative bipolar junction transistors. In another embodiment, the NMOS FET Q1~Q3 also can be instead by P-channel metal oxide semiconductor field effect transistors or positive-negative-positive bipolar junction transistors. Therein, FIG. 2 also includes other elements, because these elements are unrelated to the present invention, the description about these elements are omitted.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. An electronic device comprising:
   a power source;
   an LED module, and
   an over-voltage protection circuit comprising a control unit and a over-voltage detection module, wherein, the LED module comprises a positive input port and a controlled port, the power source comprises an output port, the control unit comprises a control port and an over-voltage protection port; the over-voltage detection module is connected between the positive input port and ground, and is configured to detect a voltage of the positive input port of the LED module and produce a detection voltage proportional to the voltage of the positive input port; the over-voltage protection port of the control unit is configured to receive the detection voltage, the control port is connected to the controlled port of the LED module, the control unit is configured to control the LED module to work or do not work according to the detection voltage received by the over-voltage protection port;
   wherein the overt-voltage circuit further comprises:
   a trigger module connected to a 2D/3D signal port, and configured to receive a 2D signal or a 3D signal from the 2D/3D signal port and produce corresponding trigger signals, wherein, the 2D/3D signal port produces the 2D signal when the electronic device is worked at a 2D mode and produces the 3D signal when the electronic device is worked at a 3D mode; and
   an adjustment module connected between the over-voltage detection module and the trigger module, and is configured to adjust the proportion between the detection voltage produced by the over-voltage detection module and the voltage of the positive input port according to the trigger signal produced by the trigger module.

2. The electronic device of claim 1, wherein the trigger module produces a 2D trigger signal when receiving the 2D signal output by the 2D/3D signal port, and produces a 3D trigger signal when receiving the 3D signal output by the 2D/3D signal port.

3. The electronic device of claim 2, wherein the adjustment module increases the proportion between the detection voltage and the voltage of the positive input port when receiving the 2D trigger signal, and decreases the proportion between the detection voltage and the voltage of the positive input port when receiving the 3D trigger signal.

4. The electronic device of claim 1, wherein the LED module comprises a number of LED strings connected between the positive input port and ground in parallel, each LED string comprise several light-emitting diodes (LEDs) and a first N-channel metal oxide semiconductor field effect transistor (NMOS FET) which are connected in series; the LEDs are connected between the positive input port and a drain of the NMOS FET, a source of the first NMOS FET is grounded, a gate of the NMOS FET constitutes the controlled port.

5. The electronic device of claim 4, wherein the over-voltage detection module comprises a first resistor, a second resistor, and a third resistor which are connected between the positive input port and the ground in series; a connection node of the second resistor and the third resistor constitutes a detection terminal, a voltage of the detection terminal is the detection voltage produced by the over-voltage detection module, the detection terminal is connected to the over-voltage protection port of the control unit, and outputs the detection voltage to the over-voltage protection port of the control unit.

6. The electronic device of claim 5, wherein the adjustment module comprises a second NMOS FET, a source and a drain of the second NMOS FET are respectively connected to two ends of the second resistor.

7. The electronic device of claim 6, wherein the trigger module comprises a fourth resistor and a third NMOS FET, the fourth resistor is connected between a voltage port and a drain of the third NMOS FET, a source of the third NMOS FET is grounded, a gate of the third NMOS FET is connected to the 2D/3D signal port.

8. The electronic device of claim 4, wherein each LED string of the LED module further comprises a fifth resistor connected between the first NMOS FET and the ground; the control unit further comprises a plurality of signal pins, ends of the fifth resistors of these LED strings far away from the ground are connected to the signal pins one by one; the signal pins are configured to detect current flowing though the LED strings.

9. The electronic device of claim 1, wherein the electronic device is one selected from the group consist with a television, a display, a mobile phone, and a tablet computer.

10. An over-voltage protection circuit, configured to execute an over-voltage protection for an LED module of an electronic device, the over-voltage protection circuit comprises a control unit and an over-voltage detection module; the LED module comprises a positive input port and a controlled port; the over-voltage detection module is connected between the positive input port and ground, and is configured to detect a voltage of the positive input port of the LED module and produce a detection voltage proportional to the voltage of the positive input port; the control unit comprises a control port and an over-voltage protection port; the over-voltage protection port of the control unit is configured to receive the detection voltage, the control port is connected to the controlled port of the LED module, the control unit is configured to control the LED module to work or do not work according to the detection voltage received by the over-voltage protection port;
   wherein the overt-voltage circuit further comprises:
   a trigger module connected to a 2D/3D signal port, and configured to receive a 2D signal or a 3D signal from the 2D/3D signal port and produce corresponding trigger signals, wherein, the 2D/3D signal port produces the 2D signal when the electronic device is worked at a 2D mode and produces the 3D signal when the electronic device is worked at a 3D mode; and an adjustment module connected between the over-voltage detection module and the trigger module, and is configured to adjust the proportion between the detection voltage produced by the over-voltage detection module and the voltage of the positive input port according to the trigger signal produced by the trigger module.

11. The over-voltage protection circuit of claim 10, wherein the trigger module produces a 2D trigger signal when receiving the 2D signal output by the 2D/3D signal port, and produces a 3D trigger signal when receiving the 3D signal output by the 2D/3D signal port.

12. The over-voltage protection circuit of claim 11, wherein the adjustment module increases the proportion between the detection voltage and the voltage of the positive input port when receiving the 2D trigger signal, and decreases the proportion between the detection voltage and the voltage of the positive input port when receiving the 3D trigger signal.

13. The over-voltage protection circuit of claim 10, wherein the LED module comprises a number of LED strings connected between the positive input port and ground in parallel, each LED string comprise several light-emitting diodes (LEDs) and a first N-channel metal oxide semiconductor field effect transistor (NMOS FET) which are connected in series; the LEDs are connected between the positive input port and a drain of the NMOS FET, a source of the first NMOS FET is grounded, a gate of the NMOS FET constitutes the controlled port.

14. The over-voltage protection circuit of claim 13, wherein the over-voltage detection module comprises a first resistor, a second resistor, and a third resistor which are connected between the positive input port and the ground in series; a connection node of the second resistor and the third resistor constitutes a detection terminal, a voltage of the detection terminal is the detection voltage produced by the over-voltage detection module, the detection terminal is connected to the over-voltage protection port of the control unit, and outputs the detection voltage to the over-voltage protection port of the control unit.

15. The over-voltage protection circuit of claim 14, wherein the adjustment module comprises a second NMOS FET, a source and a drain of the second NMOS FET are respectively connected to two ends of the second resistor.

16. The over-voltage protection circuit of claim 15, wherein the trigger module comprises a fourth resistor and a third NMOS FET the fourth resistor is connected between a voltage port and a drain of the third NMOS FET, a source of the third NMOS FET is grounded, a gate of the third NMOS FET is connected to the 2D/3D signal port.

17. The over-voltage protection circuit of claim 13, wherein each LED string of the LED module further comprises a fifth resistor connected between the first NMOS FET and the ground; the control unit further comprises a plurality of signal pins, ends of the fifth resistors of these LED strings far away from the ground are connected to the signal pins one by one; the signal pins are configured to detect current flowing though the LED strings.

* * * * *